(12) United States Patent
Rune

(10) Patent No.: US 7,551,926 B2
(45) Date of Patent: *Jun. 23, 2009

(54) TERMINAL-ASSISTED SELECTION OF INTERMEDIARY NETWORK FOR A ROAMING MOBILE TERMINAL

(75) Inventor: Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 632 days.

This patent is subject to a terminal disclaimer.

(21) Appl. No.: 10/960,780

(22) Filed: Oct. 8, 2004

(65) Prior Publication Data

US 2006/0077924 A1    Apr. 13, 2006

(51) Int. Cl.
*H04W 4/00* (2009.01)

(52) U.S. Cl. .............. 455/435.1; 455/435.2; 455/432.1; 370/401; 370/395.3

(58) Field of Classification Search ......... 370/342, 370/230, 218, 338, 349, 331, 252, 351, 335, 370/355, 389, 390, 395.3, 241, 395.31, 395.32, 370/395.42, 395.52, 467, 352, 401, 400, 370/463, 328, 395.2, 236, 277; 455/432.1, 455/422.1, 424, 425, 456.5, 456.6, 550.1, 455/561, 435.2, 433, 575.1, 435.1, 432.3, 455/456.2, 435.3, 512, 133, 555, 554.1, 554.2, 455/426.1, 426.2, 436, 437, 445, 442, 552.1, 455/525, 509, 450, 410, 411; 709/250, 227, 709/229, 223, 230; 340/5.8, 286.02; 713/168, 713/170, 166, 155

See application file for complete search history.

(56) References Cited

U.S. PATENT DOCUMENTS 5,570,084 A    10/1996  Ritter et al.
5,862,480 A *   1/1999  Wild et al. ................ 455/432.2
6,434,134 B1    8/2002  La Porta et al.
6,578,085 B1    6/2003  Khalil et al.
6,636,498 B1   10/2003  Leung
6,879,584 B2    4/2005  Thro et al.
6,895,434 B1    5/2005  Chandrupatla et al.

(Continued)

FOREIGN PATENT DOCUMENTS

EP          1 376 973         1/2004
WO       WO 03/037023         5/2003
WO        2004/017564         2/2004
WO        2004/064442         2/2004

OTHER PUBLICATIONS

B. Aboba, M. Beadles, J. Arkko, and P. Eronen; "The Network Access Identifier;" Sep. 30, 2004.

(Continued)

*Primary Examiner*—Duc Nguyen
*Assistant Examiner*—Charles Chow
(74) *Attorney, Agent, or Firm*—Nixon & Vanderhye P.C.

(57) ABSTRACT

Terminal-assisted selection of intermediary network for a roaming mobile terminal is disclosed. The mobile terminal determines if a local access network is associated with the mobile's home service network. If not, or if the mobile terminal cannot determine whether the local access network is associated with its home service network, the mobile terminal sends a list of intermediary service networks to the local access network. The local access network can select one of the intermediary service networks to be used in an authentication procedure between the mobile terminal the home service network.

41 Claims, 5 Drawing Sheets

U.S. PATENT DOCUMENTS

| | | | |
|---|---|---|---|
| 6,904,055 B2* | 6/2005 | Pichna et al. | 370/467 |
| 6,917,605 B2 | 7/2005 | Kakemizu et al. | |
| 6,922,404 B1 | 7/2005 | Narayanan et al. | |
| 7,068,640 B2* | 6/2006 | Kakemizu et al. | 370/349 |
| 7,080,151 B1* | 7/2006 | Borella et al. | 709/230 |
| 7,151,931 B2 | 12/2006 | Tsao et al. | |
| 7,164,912 B2* | 1/2007 | Buckley et al. | 455/435.2 |
| 7,167,705 B2 | 1/2007 | Maes | |
| 7,168,090 B2 | 1/2007 | Leung | |
| 2001/0049790 A1* | 12/2001 | Faccin et al. | 713/185 |
| 2002/0040390 A1 | 4/2002 | Sullivan et al. | |
| 2002/0068565 A1 | 6/2002 | Purnadi et al. | |
| 2002/0087674 A1 | 7/2002 | Guilford et al. | |
| 2002/0122394 A1 | 9/2002 | Whitmore et al. | |
| 2002/0197991 A1* | 12/2002 | Anvekar et al. | 455/432 |
| 2003/0119481 A1* | 6/2003 | Haverinen et al. | 455/411 |
| 2003/0176188 A1 | 9/2003 | O'Neill | |
| 2003/0177267 A1 | 9/2003 | Orava et al. | |
| 2004/0005892 A1 | 1/2004 | Mayer et al. | |
| 2004/0037260 A1 | 2/2004 | Kakemizu et al. | |
| 2004/0039827 A1 | 2/2004 | Thomas et al. | |
| 2004/0066756 A1* | 4/2004 | Ahmavaara et al. | 370/328 |
| 2004/0068571 A1 | 4/2004 | Ahmavaara | |
| 2004/0073786 A1 | 4/2004 | O'Neill et al. | |
| 2004/0106393 A1 | 6/2004 | Chowdhury et al. | |
| 2004/0141488 A1 | 7/2004 | Kim et al. | |
| 2004/0142658 A1* | 7/2004 | McKenna et al. | 455/11.1 |
| 2004/0192306 A1 | 9/2004 | Elkarat et al. | |
| 2004/0228347 A1 | 11/2004 | Hurtta et al. | |
| 2004/0235476 A1* | 11/2004 | Martlew | 455/436 |
| 2004/0249915 A1* | 12/2004 | Russell | 709/223 |
| 2005/0002407 A1* | 1/2005 | Shaheen et al. | 370/401 |
| 2005/0025091 A1 | 2/2005 | Patel et al. | |
| 2005/0037755 A1* | 2/2005 | Hind et al. | 455/435.3 |
| 2005/0041650 A1* | 2/2005 | O'Neill | 370/355 |
| 2005/0075129 A1 | 4/2005 | Kuchibhotla et al. | |
| 2005/0079869 A1 | 4/2005 | Khalil et al. | |
| 2005/0148299 A1* | 7/2005 | Buckley | 455/41.2 |
| 2005/0153684 A1* | 7/2005 | Rodrigo | 455/411 |
| 2005/0174945 A1 | 8/2005 | Carrion-Rodrigo | |
| 2005/0181788 A1 | 8/2005 | Muhonen | |
| 2005/0193150 A1 | 9/2005 | Buckley et al. | |
| 2005/0198294 A1 | 9/2005 | Chandrupatla et al. | |
| 2005/0272466 A1* | 12/2005 | Haverinen et al. | 455/552.1 |
| 2005/0276229 A1* | 12/2005 | Torabi | 370/252 |
| 2006/0045249 A1 | 3/2006 | Li et al. | |
| 2006/0111107 A1 | 5/2006 | Zhang | |
| 2006/0153135 A1* | 7/2006 | Ascolese et al. | 370/331 |
| 2006/0166699 A1 | 7/2006 | Aghvami et al. | |
| 2006/0185013 A1 | 8/2006 | Oyama et al. | |
| 2006/0187892 A1* | 8/2006 | Zhang | 370/338 |
| 2006/0212700 A1 | 9/2006 | Zhang | |
| 2006/0251049 A1* | 11/2006 | Grimminger et al. | 370/352 |
| 2007/0036120 A1* | 2/2007 | Zhang et al. | 370/338 |

OTHER PUBLICATIONS

3GPP TS 33.234 Vo. 6.0; "Wireless Local Area Network (WLAN) Interworking Security (Release 6);" Oct. 10, 2003.

International Search Report and Written Opinion of the International Searching Authority mailed Jan. 13, 2006 in corresponding Application PCT/SE2005/001344.

Related U.S. Appl. No. 10/960,783, filed Oct. 8, 2004; Inventor: Rune.

Related U.S. Appl. No. 10/960,782, filed Oct. 8, 2004; Inventor: Rune.

Related U.S. Appl. No. 10/960,781, filed Oct. 8, 2004; Inventor: Rune.

Vollbrecht et al., "AAA Authorization Framework", RFC 2904, IETF, Aug. 2000.

International Search Report and Written Opinion of the International Searching Authority mailed Dec. 27, 2005 in corresponding Application No. PCT/SE2005/001347.

3GPP TS 33.234 Vo. 6.0, Wireless Local Area Network (WLAN) Interworking Security (Release 6), Oct. 10, 2003.

B. Aboba, M. Beadles, J. Arkko, and P. Eronen; "The Network Access Identifier," Sep. 30, 2004.

* cited by examiner

TERMINAL-ASSISTED SELECTION OF INTERMEDIARY NETWORK FOR A ROAMING MOBILE TERMINAL

CROSS-REFERENCES TO RELATED APPLICATIONS

This application is related to commonly-assigned application Ser. No. 10/960,782 entitled, "Home Network-Assisted Selection Of Intermediary Network For A Roaming Mobile Terminal", commonly-assigned application Ser. No. 10/960,783 entitled, "Enhancement of AAA Routing Originated from a Local Access Network Involving Intermediary Network Preference," and commonly-assigned application Ser. No. 10/960,781 entitled, "Enhancement of AAA Routing Initiated from a Home Service Network Involving Intermediary Network Preferences." The disclosures of these applications are incorporated by reference.

FIELD OF THE INVENTION

The present invention relates to a method and apparatus for establishing a connection via an access network, for example, a wireless local area network (WLAN) communicating with at least one mobile terminal and at least one service access or backbone network that includes a mobile terminal authentication and/or authorization process to obtain service. In this regard, the present invention generally relates to interworking a local wireless access network like a WLAN (e.g., based on IEEE 802.11) and public land mobile networks (PLMN) like a UMTS network, and in particular, to roaming and authentication, authorization, and/or accounting (AAA) configurations for such networks. But the invention may be applied to other types of wireless access networks and PLMNs.

BACKGROUND AND SUMMARY

Wireless communications have enjoyed tremendous growth and permit both voice and data communications on a global scale. Indeed, WLAN access networks are currently deployed in many public places, such as airports, hotels, shopping malls, and coffee shops. The WLAN market is currently undergoing a rapid expansion and is being offered as a complementary service for mobile operators. PLMN core network operators, such as GPRS and UMTS network operators, traditionally provide access to mobile packet data services via a wide area GPRS or UMTS network. More recently, those mobile operators have also offered that mobile packet data service directly through a high capacity WLAN access network. Ideally, the mobile operators can provide the packet data service seamlessly between PLMN and WLAN.

There are several important requirements for a mobile operator's complementary WLAN service. First, the WLAN must interwork PLMN, e.g., GPRS and UMTS, established standards. GPRS and/or UMTS are used as non-limiting examples of a PLMN. Specifically, it must be possible to reuse existing GPRS/UMTS authentication and authorization mechanisms for WLAN access without degrading the security of the GPRS/UMTS network. Second, roaming must be permitted and specified between wide area cellular radio access and WLAN access networks. Significantly, roaming between different mobile operator WLANs must be supported. A WLAN access network may have a direct or an indirect relationship with one or more service networks.

FIG. 1 illustrates an access configuration where a mobile terminal (MT) 10 initially requests access via a local access network 12. Local access network 12 typically provides "hotspot" wireless connectivity for WLAN clients like the mobile terminal 10 present in its local access coverage area. The local access network 12 is connected to a home service network 14, which provides the ultimate communication service and maintains the direct relationship to the mobile terminal 10. The local access network 12 includes one or more access points 16 (e.g., radio base stations) that provide access to the communication services over the radio or wireless interface. An access router 18 is the data gateway to the Internet and/or an Intranet 13 and to the home service network 14, and it routes data between the mobile terminal 10 and the home service network 14 (although the data path between the access router 18 and the home service network 14 is not shown). The authentication, authorization, and/or accounting (AAA) server 20 is involved in performing authentication and/or authorization of the mobile terminal 10 before access to services are permitted. In this regard, AAA is used as a general term to refer to one or more of authentication, authorization, or accounting and similar operations. The AAA server 20 is also involved in accounting functions once access is permitted. The home AAA server 24 is coupled to a home subscriber server (HSS) 22, which accesses a home subscriber server database (not shown). The home AAA server 24 authenticates and authorizes the mobile terminal using authentication and authorization procedures, which are often performed using the well-known RADIUS or Diameter protocols.

FIG. 2 illustrates how the local access may have an indirect (i.e., via an intermediary) relationship with a home service network. The local access network has an association with intermediary service networks 30, 34, and 38, and each intermediary service network has its own AAA server 32, 36, and 40, respectively. But only two intermediary service networks 30 and 34 have roaming agreements with the home service network 14. Although not illustrated, there may also be a network (or even multiple networks) between the local access network and the intermediary service networks 30, 34, and 38 in the form of a "roaming consortium."

When a UMTS/WLAN subscriber accesses a WLAN access network, the subscriber's terminal sends a network access identifier (NAI) of the subscriber to the network. An NAI is an identifier with format "name@operator-realm," as described in, "The Network Access Identifier," RFC 2486, January 1999. The NAI is sent using Extensible Authentication Protocol (EAP) over LAN (EAPOL). The transfer of the NAI precedes either an EAP Authentication and Key Agreement (AKA) procedure, as described in J. Arkko et al., "EAP AKA Authentication," Internet-Draft draft-arkko-ppext-eap-aka-10.txt, or an EAP Subscriber Identity Module (SIM) procedure, as described in H. Haverinen et al., "EAP SIM Authentication," Internet-Draft draft-haverinen-ppext-eap-sim-11.txt. The AAA client located in the WLAN AP 16 or the access router 18 (most commonly in the AP) forwards the NAI via an AAA protocol to a service network AAA server, (e.g,. RADIUS, as described C. Rigney et al., "Remote Authentication Dial In User Service (RADIUS)," RFC 2865, or Diameter, as described in Pat R. Calhoun et al., "Diameter Base Protocol" RFC 3588, Pat R. Calhoun et al., "Diameter Network Access Server Application," Internet-Draft draft-ietf-AAA-diameter-nasreq-12.txt, and Ed P. Eronen, "Diameter Extensible Authentication Protocol (EAP) Application" draft-ietf-AAA-eap-02.txt. This is normally a default AAA server, which may be either the AAA server of the UMTS/WLAN operator or an AAA server of the WLAN network operator (if these operators are not one and the same). In the latter case, the AAA server in the WLAN network forwards the NAI to the AAA server in the subscriber's home UMTS/

WLAN network via RADIUS or Diameter. The home AAA server processes the received message and performs an authentication procedure towards the mobile terminal. Subsequent AAA messages (e.g., for accounting during the session) follow the same path between the AAA client and the home AAA server, possibly via an AAA server in the WLAN network.

If a UMTS/WLAN subscriber roams into a WLAN network that has no association with the home network of the subscriber, then the subscriber is granted access only if the visited WLAN network has an association with a UMTS network that has a roaming agreement with the roaming subscriber's home UMTS network. This association may be a direct association or an indirect association via an AAA broker or proxy.

The case where the AAA communication between the visited WLAN access network and the home network of the subscriber must go through a visited UMTS network, (i.e., the UMTS network with which the home UMTS network of the subscriber has a roaming agreement), is illustrated in FIG. 2. More specifically, AAA messages sent from the AAA client to the AAA server of the visited WLAN network are then routed via the AAA server of an intermediary visited UMTS network (30 or 34) to the AAA server 24 of the subscriber's home UMTS network 14. AAA messages in the other direction follow the same path in the opposite direction.

A problem with this arrangement is that the AAA server 20 of the visited WLAN network 12 may have associations with multiple UMTS networks. Thus, the WLAN AAA server 20 does not know which of its associated UMTS networks has a roaming agreement with the home UMTS network 14 of the roaming subscriber. Even if the AAA server 20 of the visited WLAN network 12 did have this knowledge, the home UMTS network 14 of the subscriber may well have roaming agreements with more than one of the UMTS networks associated with the visited WLAN network 12. Because the choice of intermediary visited UMTS network is either impossible or arbitrary for the AAA server 20 of the visited WLAN network 12, the home service network 14 and/or the subscriber should be able to make the choice so that the most appropriate intermediary visited service network is selected. For example, in FIG. 2, intermediary service network 1 may be selected as the intermediary visited network, but intermediary service network 2 may be a better choice or simply the intermediary service network the subscriber prefers. In any event, intermediary service network 3 would not be chosen, because the home service network 14 does not have a roaming agreement with it.

There are several approaches to this problem. In two possible approaches, the WLAN network provides the mobile terminal with information about the service networks associated with the WLAN network. The mobile terminal then selects one of the associated service networks as its intermediary visited service network and indicates the selected network through information incorporated in an "extended NAI" or a "decorated NAI." The format of the decorated NAI could be, for example, home-realm/name@intermediary-visited-network-realm or home-realm!name@intermediary-visited-network-realm. The AAA server of the intermediary visited service network would interpret the decorated NAI, delete the intermediary-visited-network-realm part and move the home-realm part to its normal position after the @ character and delete the slash character or exclamation mark (thus turning the decorated NAI into a regular NAI) before forwarding the AAA message (in which the decorated NAI was included) to the AAA server of the subscriber's home network. Alternatively, the AAA server of the visited WLAN network could perform this operation before sending the AAA message to the AAA server of the intermediary visited service network.

The difference between the two approaches is how the information about associated networks is conveyed to the terminal, and to a certain extent, how the decorated NAI is transferred to the AAA server of the visited WLAN network. In the first approach, the Service Set Identifier (SSID) normally broadcast or "advertised" by the WLAN APs could be modified to contain information about associated UMTS network(s). The mobile terminal could then choose to access the WLAN access network or not, and if it chooses to access the WLAN access network, the mobile terminal can supply network selection information in the decorated NAI in the EAP-Identity Response message (responding to the initial EAP-Identity Request message from the WLAN network) during the authentication procedure.

But because the size of the SSID is limited, (no more than 30 octets of data), this approach relies on the concept of virtual APs to be implemented. With the virtual AP concept, a single physical AP can implement multiple virtual APs so that several WLAN hotspot providers can share the same infrastructure. In the context of network advertising, each associated UMTS network would be represented by its own virtual AP. Each virtual AP would send its own beacon frames advertising a unique SSID that identifies the corresponding UMTS network.

In the second approach, the information about associated UMTS networks could be included in an EAP-Identity Request message, (the EAP Identity Request message format is described in L. Blunk, et al., "PPP Extensible Authentication Protocol (EAP)," RFC 2284), from the WLAN network to the terminal. Specifically, the intermediary network information could be included after a NULL character in the Type-Data field in the EAP-Identity Request message. The EAP-Identity Request message may originate from the WLAN AP (in case it is the initial EAP-Identity Request message) or the AAA server of the visited WLAN network (in case it is a subsequent EAP-Identity Request message). In the former case, the AP includes this information in the initial EAP-Identity Request message provided that the AP, and not the access router, is the EAP authenticator. In the latter case, the AAA server of the visited WLAN network sends the information about associated UMTS networks to the terminal in a second EAP-Identity Request message only if the NAI received from the user/terminal in the response to the initial EAP-Identity Request message is not enough to route the AAA request to the home AAA server of the user. The mobile terminal could also explicitly request the AAA server of the visited WLAN network to send the network information in a second EAP-Identity Request message by providing a NAI with a dedicated request string (e.g., "Network-Info-Requested") in the name portion of the NAI in the first EAP-Identity Response message.

These approaches are terminal-based network selection methods in that the selection of the intermediary visited service network is based on criteria available in the terminal and/or manually input from the user. Available data that can be used for this purpose (besides manual user input) include, e.g., the following USIM files: User controlled PLMN selector with Access Technology (USIM file: $EF_{PLMNwAcT}$), which is a user defined PLMN priority list, Operator controlled PLMN selector with Access Technology (USIM file: $EF_{OPLMNwACT}$), which is an operator defined PLMN priority list, and the Forbidden PLMNs (USIM file: $EF_{FPLMN}$), which is a list of forbidden PLMNs in which roaming is not allowed (see 3 GPP TS 31.102 v6.2.0, "3$^{rd}$ Generation Partnership Project; Technical Specification Group-Terminals; Characteristics of the USIM application (Release 6)."

A problem with the first approach, as identified earlier, is the limited space in the SSID field, which makes it necessary to use the virtual AP concept. Using the virtual AP concept for this purpose is problematic for several reasons. The fact that each virtual AP sends its own beacon frame increases signaling overhead (in terms of resources consumed by beacons) and has substantial scaling problems. Even a few virtual APs produce beacons that consume on the order of 10% of the total AP capacity. If numerous UMTS networks, e.g., UMTS networks associated with the WLAN network via a roaming consortium, were advertised, the beacons would consume the entire AP capacity. In addition, most deployed APs do not implement the virtual AP concept, and its presence in future APs is still uncertain. Thus, numerous installed APs would have to be upgraded. Another problem is that many deployed WLAN access networks may not be in a position to change their SSID.

The second approach is also problematic. In the variant where the network information is sent in the first EAP-Identity Request message, the behavior of the APs must be modified (which is particularly undesirable considering the number of deployed APs). In the other variant, a roundtrip delay between the terminal and the AAA server in the visited WLAN network is added to the overall access delay. In addition, since some EAP implementations already use the space beyond a NULL character in the Type-Data field of the EAP-Identity Request to convey various options, there is a potential risk for interference between intermediary UMTS network information transfer and existing use of the data space.

A general problem with all of these approaches is that they require the WLAN network to be knowledgeable about all the potential intermediary UMTS networks. This may not always be the case or even possible, e.g.; when there is a roaming consortium between the WLAN network and one or several of the potential intermediary UMTS networks. Thus, schemes relying on network information advertised by the WLAN network may fail in some situations. An additional problem with these approaches is that they require EAPOL to be supported in the WLAN access network, which excludes, e.g., WLAN access networks that use web-based login procedures.

The invention provides terminal-assisted selection of an intermediary service network for a roaming mobile terminal that overcomes these various problems. The term "mobile terminal" encompasses mobile terminal equipment, the user or subscriber of the mobile terminal, and the identity of a personal entity such as a SIM-card. So for example, authorization or authentication of the mobile terminal includes authorization or authentication of the user identity and authorization or authentication of the mobile terminal. The term "service network" encompasses any type of entity that can serve subscribers or facilitate serving of subscribers by participating in authentication, authorization and/or accounting signaling, e.g., a network serving its subscribers, an intermediary network, or a roaming consortium, e.g., in the form of a AAA server.

The mobile terminal determines if the local access network is associated with the mobile's home service network. If not, or if the mobile terminal can not determine whether the local access network is associated with its home service network, the mobile terminal sends a list of intermediary service networks to the local access network. The local access network can select one of the intermediary service networks to be used in an authentication procedure between the mobile terminal and the home service network. The intermediary service networks are preferably listed by priority to permit the local access network to select the highest priority intermediary service network. The list can be created in any suitable fashion including using a user-defined, visited service network priority list, a home network operator-defined visited service network list, a list of forbidden visited service networks, or using manual user inputs.

In one non-limiting, example embodiment, the list is included in a network access message by the mobile terminal as part of an authentication procedure. The network access message is a network access identifier (NAI) transmitted in an extensible authentication protocol (EAP) identity response message sent in response to an EAP identity request message received by the mobile terminal. If the list is relatively long, it can be sent using multiple EAP messages.

The network access message includes a name part and a realm part. Although the list may be included in the name part, the realm part is preferred and may include a mobile country code and mobile network code associated with a particular intermediary service network included in the list. The list preferably ends with the realm identifier for the home service network. Alternatively, each intermediary service network may be identified in the list using a domain name or a fully qualified domain name (FQDN) of an authentication server of the intermediary visited service network. If desired, the terminal-assisted selection scheme may also be used in combination with another intermediary selection network scheme, e.g., the one described in commonly-assigned application Ser. No. 10/960,782, entitled, "Home Network-Assisted Selection Of Intermediary Network For A Roaming Mobile Terminal."

DETAILED DESCRIPTION

The following description sets forth specific details, such as particular embodiments, procedures, techniques, etc. for purposes of explanation and not limitation. It will be appreciated by one skilled in the art that other embodiments may be employed apart from these specific details. For example, although the following description is facilitated using non-limiting WLAN/UMTS examples, the present invention may be employed in any local access/PLMN service network. In some instances, detailed descriptions of well-known methods, interfaces, circuits, and signaling are omitted so as not to obscure the description with unnecessary detail. Moreover, individual blocks are shown in the figures. Those skilled in the art will appreciate that the functions of those blocks may be implemented using individual hardware circuits, using software programs and data in conjunction with a suitably programmed digital microprocessor or general purpose computer, using application specific integrated circuitry (ASIC), and/or using one or more digital signal processors (DSPs).

Figure 3A:
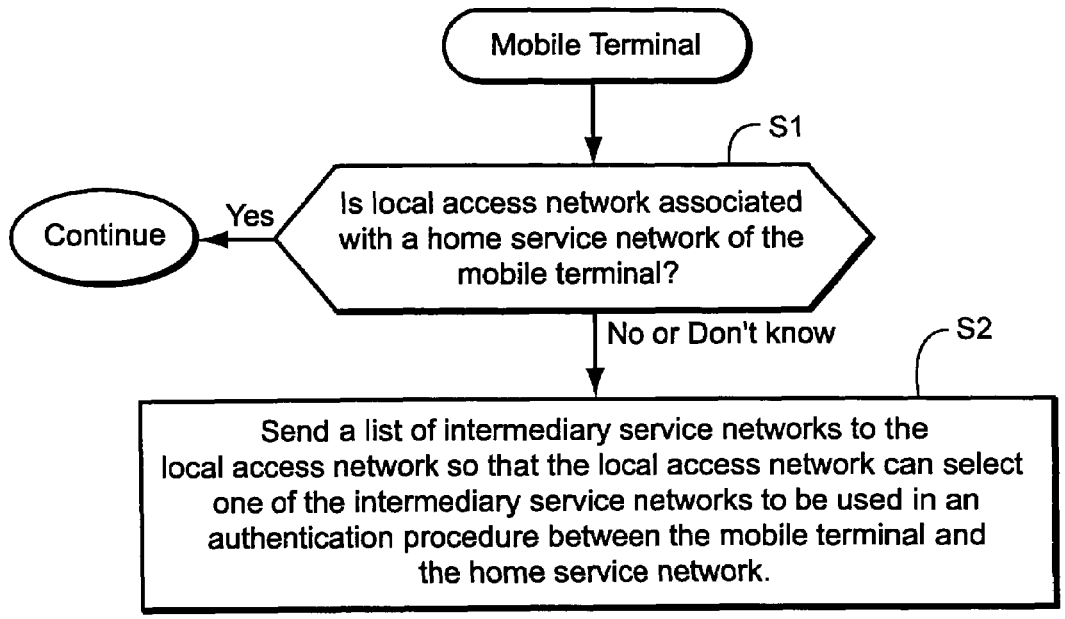
FIG. 3A is a flowchart illustrating example procedures that may be performed by a mobile terminal requesting network access and a data packet service.
Figure 3B:
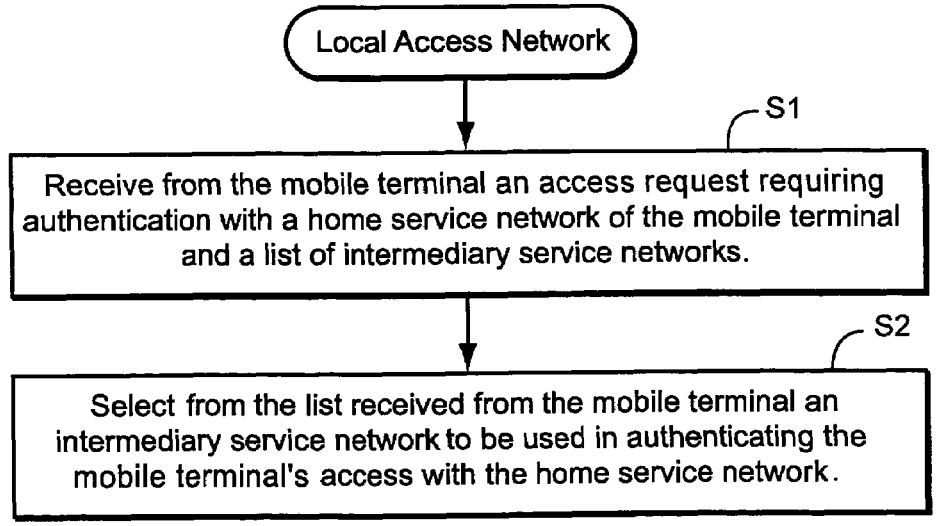
FIG. 3B is a flowchart illustrating example procedures that may be performed by the local access network in response to a mobile terminal's access request.

Reference is now made to the flowchart diagrams in FIGS. 3A and 3B, which illustrate example procedures that may be performed by a mobile terminal requesting network access to a packet data service (FIG. 3A) and example procedures that may be performed by a local access network in response to the mobile terminal's request for service (FIG. 3B). In FIG. 3A, the mobile determines whether the local access network is associated with the mobile's home service network (step S1). If it is, signaling proceeds as normal. Otherwise, or if the mobile does not know, the mobile terminal sends a list of intermediary networks to the local access networks so that the local access network can select one of the intermediary service network to be used in an authentication procedure between the mobile and the home service network (step S2). In FIG. 3B, the local access network receives from the mobile terminal a request for service requiring authentication with the home service network of the mobile terminal, and a list of intermediary service networks (step S1). The local access network then selects from the list received from the mobile terminal an intermediary service network to be used in authenticating the mobile terminal's access with the home service network (step S2).

Figure 1:
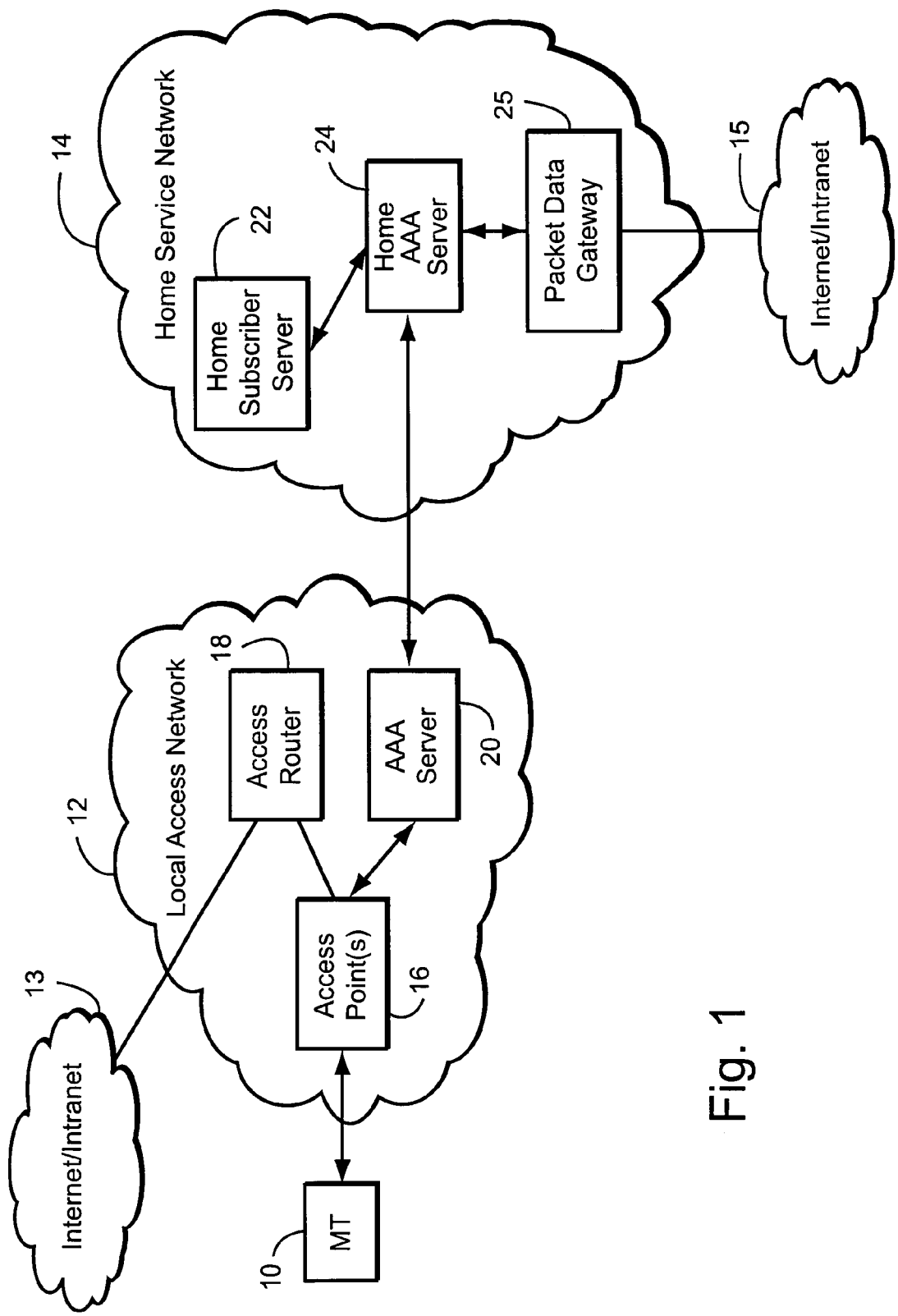
FIG. 1 is a diagram illustrating a system in which packet data services provided by a home service network can be accessed via a local access network.
Figure 2:
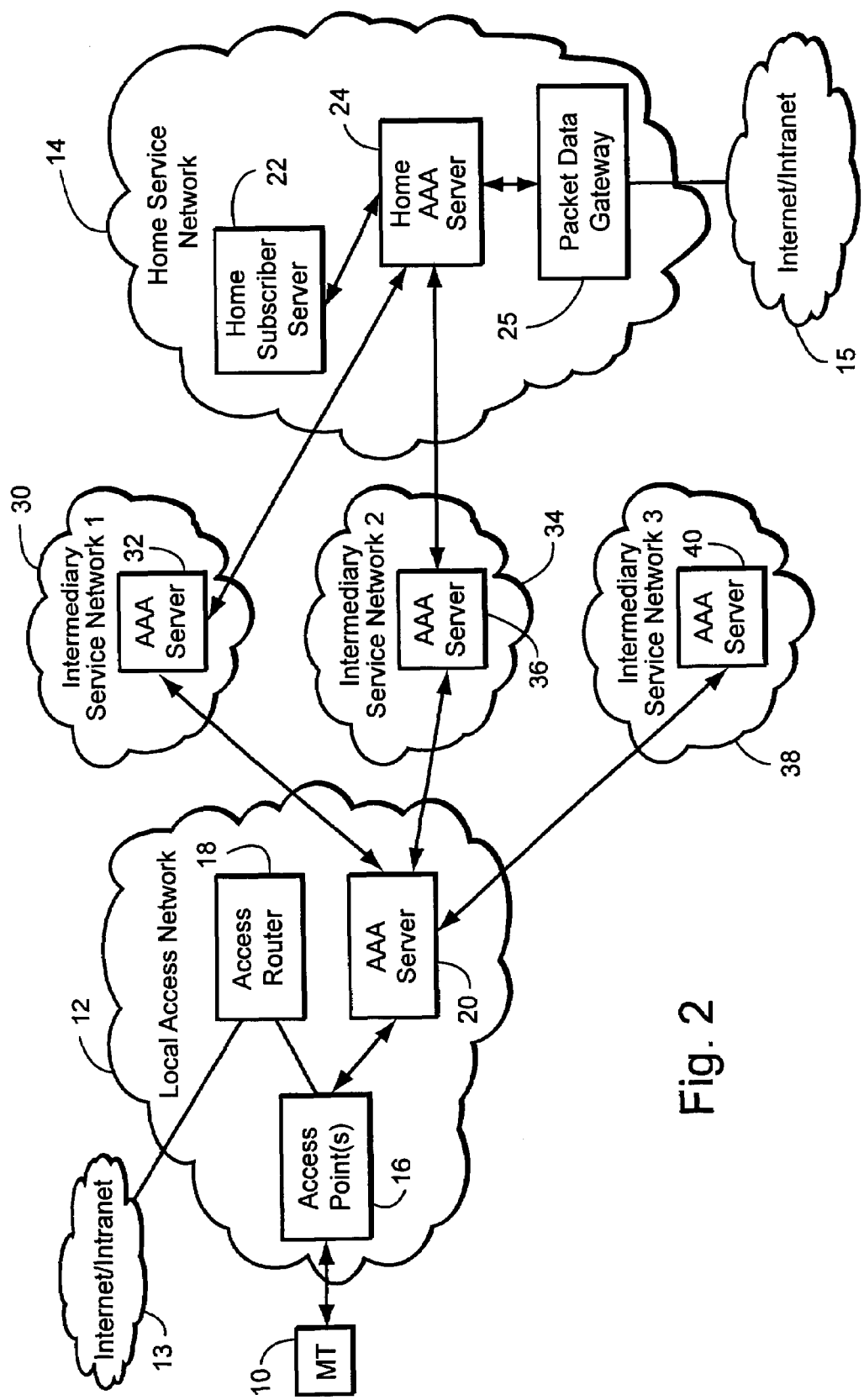
FIG. 2 illustrates indirect access to the home service network via the local access network and an intermediary service network.

A non-limiting example implementation is now described in conjunction with FIG. 2. The example local access network is a WLAN, and the example service networks are UMTSs. When the mobile terminal 10 of a UMTS/WLAN subscriber is about to access the WLAN network 12, it may or may not know whether the WLAN network 12 has an association with the home service network 14 of the subscriber. If the mobile terminal 10 knows (e.g., because it recognizes the SSID broadcast by the access point of the WLAN network 12) that the WLAN network 12 has an association with the subscriber's home service network 14, it accesses the WLAN network 12 in the regular way using the subscriber's ordinary NAI.

But if the mobile terminal 10 does not know whether the WLAN network 12 has an association with the subscriber's home network 14 (or the mobile already knows that it does not), the mobile terminal 10 includes in the NAI a prioritized list of candidate intermediary visited UMTS networks 30 and 34. The intermediary visited UMTS network 38 is not a candidate, and is not included in the list, because it has no association or relationship to the home network 14. The list only includes UMTS networks that have AAA relations (roaming agreements) with the subscriber's home UMTS network. This list is preferably included in the realm part of the NAI, but it could also be included in the name part. The list could include the fully-qualified domain names (FQDNs) of the AAA servers 32 and 36 of the candidate intermediary visited networks, respectively. But a more compact format is to include only the mobile network code (MNC) and mobile country code (MCC) (which may also be part of the FQDN) of each candidate intermediary visited network.

Figure 4:
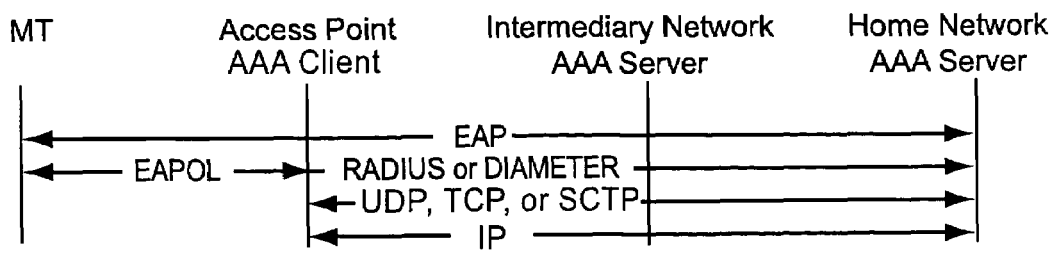
FIG. 4 illustrates example protocols between various nodes in FIG. 2.

FIG. 4 illustrates example protocols which may be used to convey the access and AAA type signals between the various nodes shown in FIG. 2 and also in FIG. 5 described below. The highest protocol layer is the extensible authentication protocol (EAP) which runs between the mobile 10 and the home AAA server 24. EAP over LAN (EAPOL) runs between the mobile terminal 10 and the WLAN access point AAA server 20. RADIUS or Diameter runs between the local access point AAA client 16 and the home network AAA server 24 on top of a transport layer protocol and the Internet Protocol (IP). If the AAA protocol is RADIUS, the transport layer protocol is User Datagram Protocol (UDP). If the AAA protocol is Diameter, the transport layer protocol is either Transmission Control Protocol (TCP) or Stream Control Transmission Protocol (SCTP). Of course, other suitable protocols may be used.

Figure 5:
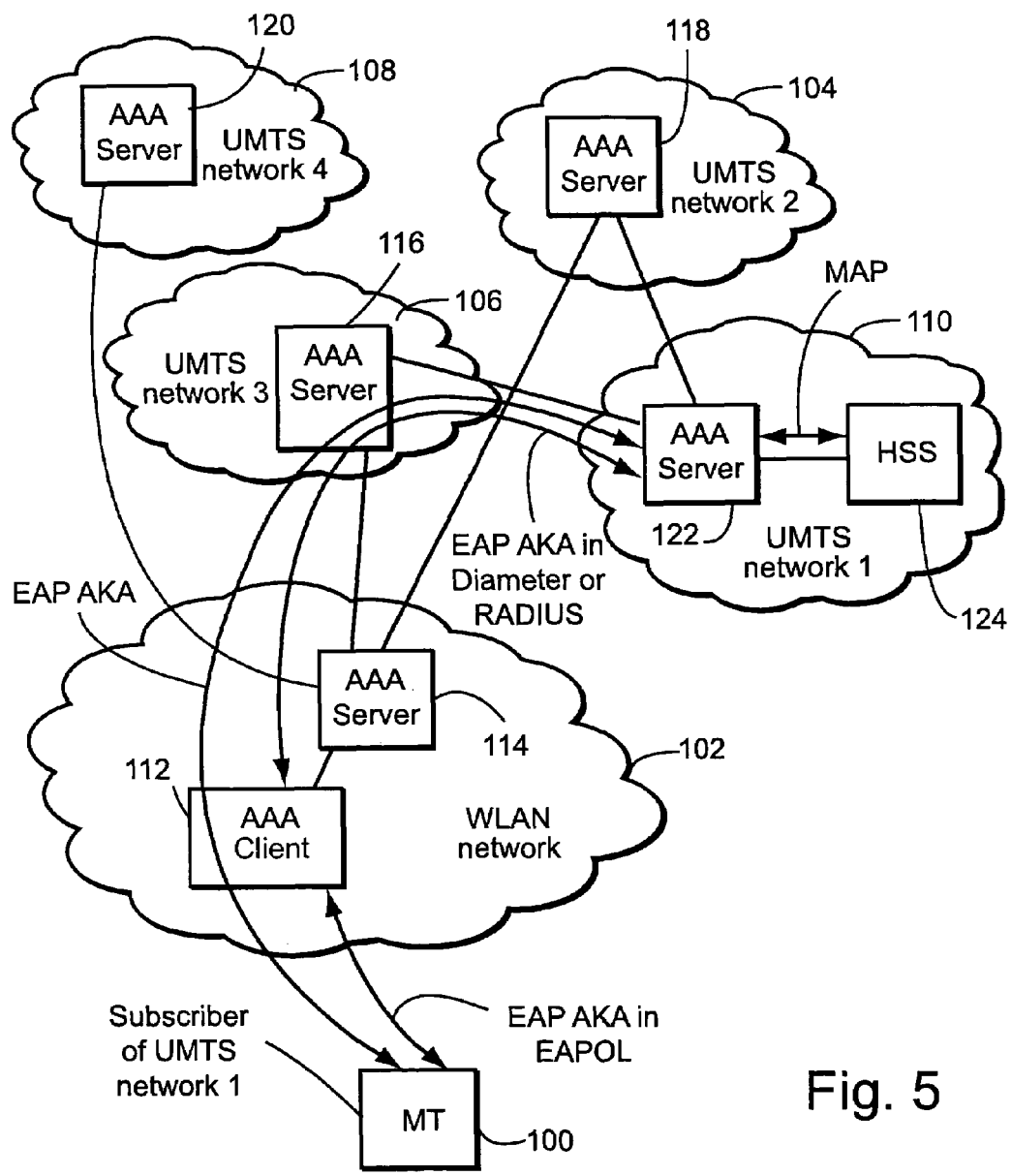
FIG. 5 illustrates a non-limiting example application in which the local access network is a WLAN network and the intermediary and home service networks are UMTS networks.

FIG. 5 illustrates a non-limiting example application in which the local access network is a WLAN network and the intermediary and home service networks are UMTS networks. A mobile terminal (MT) 100 is a subscriber of UMTS network 1 110, which makes UMTS network 1 the home service network. The home service network includes an AAA server 122 coupled to a home subscriber server (HSS) 124 used in authentication, authorization and accounting operations as is well known. The AAA server 122 and HSS 124 communicate using mobile application part (MAP) protocol. The mobile terminal is a roaming UMTS/WLAN subscriber and makes access to a visited WLAN network 102 via an AAA client 112, (which probably is located in an access point but may also be located in an access router), which in turn is coupled to an AAA server 114. The WLAN network has associations with UMTS networks 2, 3, and 4 corresponding to network clouds 104, 106, and 108, respectively. But WLAN network 102 does not have such an association with UMTS network 1. Each of the intermediary UMTS networks 2, 3, and 4 includes a respective AAA server 118, 116, and 120. In this example, UMTS network 3 is selected as the intermediary service network. When the mobile terminal accesses the WLAN network 102, it sends the NAI of the subscriber, extended with a prioritized list of candidate intermediary visited UMTS networks, via EAPOL carrying either EAP AKA or EAP SIM. The AAA client 112 forwards the extended NAI in an AAA message using an AAA protocol, such as Diameter or RADIUS, to the AAA server 114 in the WLAN network. The AAA server 114 in the WLAN network preferably (but not necessarily) removes the prioritized list from the NAI (thereby turning it into a regular NAI) and searches the list (preferably from the highest to the lowest priority) for a service network with which it has an association. The first one it finds (in this example) is UMTS network 3 106, which consequently is selected as the visited intermediary UMTS network. The AAA server 114 in the WLAN network then forwards the AAA message to the intermediary UMTS network AAA server 116. The intermediary UMTS network AAA server 116 forwards the message to the AAA server 122 in the home UMTS network. The home AAA server 122 processes the received message and performs the authentication procedure towards the mobile terminal 100. Subsequent AAA messages follow the same path.

Figure 6:
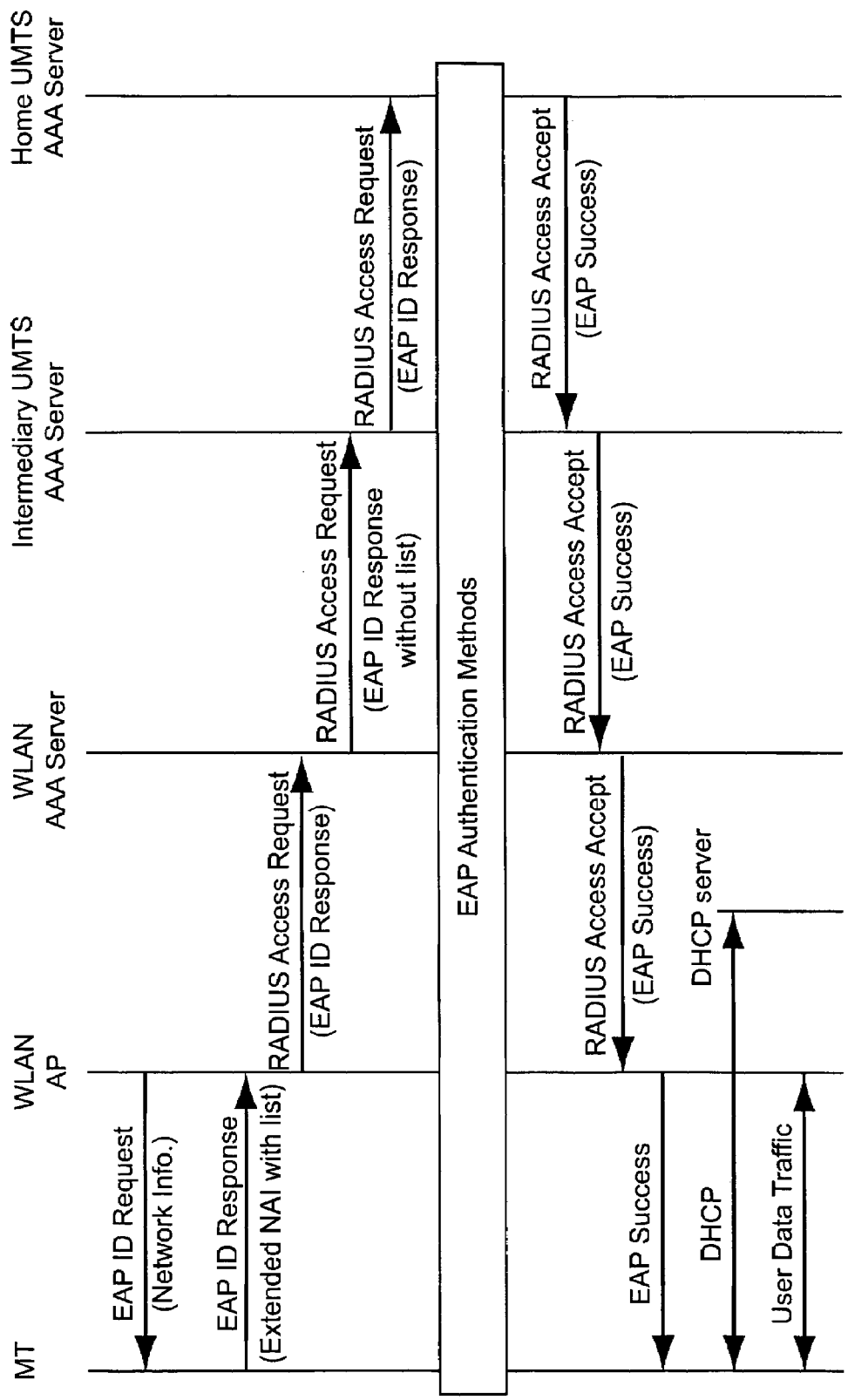
FIG. 6 is a signaling diagram illustrating example access messaging that may be used with the example application shown in FIG. 5.

Reference is now made to the example access and AAA signaling diagram shown in FIG. 6 that identifies the nodes shown in FIG. 5 as vertical lines. The WLAN access point, corresponding to the AAA client 112, sends an EAP ID Request message that requests the identity of the user. The mobile terminal sends an EAP ID Response message that includes an extended NAI with the mobile's identity as well as the list of prioritized intermediary UMTS networks. The WLAN access point/AAA client 112 sends a RADIUS Access Request message encapsulating the EAP/ID Response message to the WLAN AAA server. As described above, the WLAN AAA server preferably (but not necessarily) removes the prioritized list from the NAI and selects an intermediary UMTS network from the list before forwarding the RADIUS Access Request to the intermediary UMTS/ AAA server, which forwards it to the home UMTS/AAA server 122. The home AAA server 122 interacts with the HSS 124 to retrieve the subscription profile of the mobile terminal 100 along with authentication information. An authentication and key agreement phase is initiated, which is based on EAP AKA or EAP SIM methods. After successful authentication and key agreement, the AAA server 122 transmits a RADIUS Access Accept message which is encapsulated in an EAP Success message. The intermediary UMTS AAA server 118 forwards that message via the WLAN AAA server 114 to the WLAN AP 112. The WLAN AP extracts the EAP Success message and forwards it to the mobile terminal 100. Thereafter, the well-known dynamic host configuration protocol (DHCP) is used to enable the mobile terminal to obtain its IP address and other configuration information before user data traffic communication commences.

A non-limiting, example format of the extended NAI is "name@begin-nw-list.$MNC_{NW-1}$-$MCC_{NW-1}$.$MNC_{NW-2}$-$MCC_{NW-2}$. . . . .$MNC_{NW-n}$-$MCC_{NW-n}$.end-nw-list.home-realm." In this example, $MNC_{NW-1}$-$MNC_{NW-n}$ and $MCC_{NW-1}$-$MCC_{NW-n}$ represent the actual MNCs and MCCs of the intermediary networks in the list.

If there is not enough room in one protocol message, such as an EAP message (or in the relevant attribute in the corresponding AAA request), for the complete network list, the last network in the list could be set to, e.g., "C---C." Alternatively, the "end-nw-list" string could be replaced by "cont-nw-list." Either indicates to the WLAN AAA server that the list is not complete. The WLAN AAA server would then send another EAP-Identity Request message to retrieve the remainder of the list. The second part of the list could have the same format, but the first network in the list would be set to, e.g., "C---C" (alternatively the "begin-nw-list" string could be replaced by "cont-nw-list") to indicate that the list is a continuation of the previous part. This principle may be repeated until the WLAN AAA server obtains the complete network list. Various compression schemes to reduce the size of the list can also be employed, especially if the list only includes UMTS networks. Examples of such compression schemes include, but are not limited to, using a binary representation of the MCC/MNC numbers and/or not repeating an MCC that appears several times in the list. For the latter example, all the MNCs that are associated with the same MCC may be grouped together after a single occurrence of their common MCC. Alternatively, instead of sending repeated EAP-Identity Request messages until the complete network list is retrieved, the WLAN AAA server may scan each retrieved part of the list for a routable intermediary UMTS network. As soon as one is found, the WLAN AAA server stops sending EAP-Identity Request messages even though it may not yet have the complete network list. In any case, each transferred NAI preferably ends with the home-realm.

The network priority list can be created in the terminal with the previously-mentioned, user-defined and operator-defined PLMN priority lists and the list of forbidden PLMNs stored in the USIM (in the files $EF_{PLMNwAcT}$, $EF_{OPLMNwACT}$ and $EF_{FPLMN}$ respectively) as input data. The user could also be directly involved to edit the list.

When the visited WLAN network AAA server receives the extended NAI, it recognizes the delimiter strings in the NAI (e.g., the above-suggested "begin-nw-list" and "end-nw-list" and possibly "C---C" or "cont-nw-list") and determines that a network priority list is included. The visited WLAN network AAA server then searches the list (preferably in order of decreasing priority) for an intermediary UMTS network with which it has an association. That association may correspond to the networks whose AAA servers appear in a "peer table" of the visited WLAN AAA server. The first list entry with such an association is selected as the intermediary visited UMTS network, and the AAA messages are routed to the AAA server of this selected network. If the MCC and MNC of the UMTS networks are not included in their respective AAA server FQDNs, then the visited WLAN network AAA server is preferably configured with this information for its associated UMTS networks. It is also possible for the WLAN AAA server 20 to construct a decorated NAI (e.g., of the format home-realm/name@intermediary-visited-network-realm or home-realm!name@intermediary-visited-network-realm) using the information in the network priority list, e.g., if the selected intermediary UMTS network is reached via a roaming consortium.

Even if the WLAN network AAA server does not understand the NAI extension, the fact that the extended NAI still complies with the general NAI format specified in B. Aboba, et al. "The Network Access Identifier," RFC 2486, ensures backwards compatibility. Referring again to FIG. 2, if the WLAN network AAA server 20 has an association with the subscriber's home network, it will find a matching entry in its realm-based routing table according to the "longest match from the right" principle, since the extended NAI still ends with the ordinary home-realm of the subscriber. Thus, if the WLAN network AAA server 20 does not understand the NAI extension, (i.e. the list), the AAA message will either be routed to the subscriber's home AAA server 24 (if the WLAN network 12 has an association with the home service network 14 or some other way to find a path to the home service network 14) or routed to a default AAA server (if the WLAN network 12 has no association with the home service network 14), which in the latter case means that the realm-based routing for the AAA message will probably fail. If the AAA message with the extended NAI reaches the home AAA server 24, the home AAA server 24 ignores the network priority list included in the NAI and recognizes the non-extended NAI of one of its subscribers. In this way, the authentication procedure and the remainder of the AAA session can go on as usual.

This terminal-assisted scheme for selection of intermediary visited UMTS network can be used in combination other selection schemes such as, for example, the home network-controlled scheme described in the above-identified, commonly-assigned application. When the two schemes coexist, the visited WLAN network AAA server preferably uses the network priority list from the terminal, if there is one present in the NAI. The visited WLAN network AAA server 20 might then use the home network-controlled scheme only if the mobile terminal 10 does not provide any network preference information, or if the network priority list from the mobile terminal 10 does not include any network that has an association with the visited WLAN network 12.

In another example implementation of the terminal-assisted selection scheme made in the context of FIG. 2, the mobile terminal 10 supplies a regular NAI in response to the first EAP-Identity Request message. If the WLAN AAA server 20 cannot route the AAA request based on this NAI, it sends a second EAP-Identity Request to the mobile terminal 10. In the EAP-Identity Response message triggered by the second EAP-Identity Request message, the mobile terminal 10 includes the extended NAI that contains the intermediary service network priority list.

In an alternative example embodiment, the mobile terminal supplies information about potential intermediary networks that can be used to select more than one intermediary service network in the path between the local access network and the home service network. Assume, for example, that the mobile terminal supplies to the local access network information that enables selection of two intermediary service networks. This information then, as previously described, may include a number of potential intermediary service networks, which are associated with the home service network of the user of the mobile terminal. For explanatory purposes, these intermediary service networks are referred to as "primary intermediary service networks." In addition, to enable selection of a second intermediary service network, for each of the potential primary intermediary service networks, the information includes a number of potential intermediary service networks that are associated with the potential primary intermediary service network. For explanatory purposes these intermediary service networks are referred to as "secondary intermediary service networks."

Thus, in the information supplied by the mobile terminal, the potential intermediary service networks are grouped in groups, where each group contains one potential primary intermediary service network and zero or more potential secondary intermediary service networks that are associated with the potential primary intermediary service network. The information would be included in an extended NAI as previously described and could for example be formatted as follows: "name@begin-nw-list.$MNC_{Primary-NW-1}$-$MCC_{Primary-NW-1}$·$MNC_{Secondary-NW-1}$-$MCC_{Secondary-NW-1}$· $MNC_{Secondary-NW-2}$-$MCC_{Secondary-NW-2}$· . . . $MNC_{Secondary-NW-m}$-$MCC_{Secondary-NW-m}$·-·$MNC_{Primary-NW-2}$-$MCC_{Primary-NW-2}$·$MNC_{Secondary-NW-1}$-$MCC_{Secondary-NW-1}$· $MNC_{Secondary-NW-2}$-$MCC_{Secondary-NW-2}$· . . . $MNC_{Secondary-NW-m}$-$MCC_{Secondary-NW-m}$·-· $MNC_{Primary-NW-n}$-$MCC_{Primary-NW-n}$·$MNC_{Secondary-NW-1}$-$MCC_{Secondary-NW-1}$·$MNC_{Secondary-NW-2}$-$MCC_{Secondary-NW-2}$· . . . $MNC_{Secondary-NW-m}$-$MCC_{Secondary-NW-m}$·-·end-nw-list.home-realm." In this example list of potential primary and secondary intermediary service networks, the "-" character serves as a delimiter character separating the groups (each consisting of a potential primary intermediary service network and zero or more potential secondary intermediary service networks) from each other. The use of the index "m" as the highest index of a potential secondary intermediary service networks is not meant to imply that all groups must contain the same number of potential secondary intermediary service networks. On the contrary, each group may contain an arbitrary number (zero or more) potential secondary intermediary service networks.

This formatting the information may be generalized so as to allow selection of an arbitrarily long sequence of intermediary service networks. If more than two "levels" (denoted primary and secondary in the example above) of potential intermediary service networks are considered, each potential intermediary secondary service network would (continuing the above formatting example) be followed by zero or more potential intermediary service networks associated with the secondary intermediary service network (thereby representing the third level of potential intermediary service networks). The subgroups (each containing a potential secondary intermediary service network and zero or more potential third level intermediary service networks) could be separated by a delimiter character, e.g., "--" (and for the next level subgroups the delimiter character could be "---", etc.).

The groups are preferably priority-ordered with regards to the potential primary intermediary service networks. Within each group the potential secondary intermediary service networks are preferably priority-ordered with regards to the potential secondary intermediary service networks. This principle may be generalized to an arbitrary number of levels of potential intermediary service networks.

In this alternative example embodiment, the local access network, when receiving the information supplied by the mobile terminal, first attempts to find a potential primary intermediary service network with which it has an association (searching the information in order of priority). If none can be found, the local access network attempts to find a potential secondary intermediary service network (searching the information in order of priority), etc. If the local access network, for instance, finds a potential secondary intermediary service network with which it has an association, it selects this as the secondary intermediary service network. In this way, the local access network implicitly selects as the primary intermediary service network the potential primary intermediary service network belonging to the same group as the selected secondary intermediary service network. The local access network then constructs a decorated NAI including (in addition to the home service network realm) the realms of both the selected secondary intermediary service network and the selected primary intermediary service network. The decorated NAI could, e.g., have the following format: primary-intermediary-network-realm!home-realm!name@secondary-intermediary-network-realm (or its generalized form: level-m-1-intermediary-network-realm!level-m-2-intermediary-network-realm! . . . !primary-intermediary-network-realm !home-realm!name@level-m-intermediary-network-realm).

When used in routing of AAA messages, a decorated NAI of the above format would cause an AAA message to traverse both the selected secondary intermediary service network and the selected primary intermediary service network (in that order) before reaching the home service network. Before forwarding the AAA message, the traversed AAA server in the selected secondary intermediary service network would remove its own realm from the decorated NAI and move the realm of the selected primary intermediary service network from its position at the furthest left in the decorated NAI to its new position to the right of the @ character. The traversed AAA server in the selected secondary intermediary service network would also remove the exclamation mark (which serves as a delimiter character between realms in this example) to the left of the home-realm. The traversed AAA server in the selected primary intermediary service network would rearrange the decorated NAI in a similar way as the traversed AAA server in the selected secondary intermediary service network before forwarding the AAA message. It would remove its own realm from the decorated NAI and move the realm of the home service network from its position at the furthest left in the decorated NAI to its new position to the right of the @ character. The traversed AAA server in the selected primary intermediary service network would also remove the exclamation mark to the left of the name part of the NAI. This final rearrangement turns the decorated into a regular NAI. In a general case, the AAA message would traverse the selected $m^{th}$ level intermediary service network, the selected $(m-1)^{th}$ level intermediary service network, etc., through the selected primary intermediary service network (in that order) before reaching the home service network. Each traversed intermediary AAA server would rearrange the decorated NAI before forwarding the AAA message. It would remove its own realm (which is located to the right of the @ character) from the decorated NAI, move the realm at the furthest left of the decorated NAI to a new position at the right of the @ character, and delete the exclamation mark that was located to the right of the moved realm. When the AAA server of the home service network receives the AAA message, it knows from the absence of exclamation marks to the left of the @ character that the NAI is a regular NAI and that the AAA server itself is the final destination of the AAA message (as indicated by the realm of the home service network to the right of the @ character).

The terminal-assisted intermediary network selection scheme allows a user/terminal to influence the choice of intermediary visited UMTS network when roaming in a WLAN network that has no association with the home network of the UMTS/WLAN terminal subscriber. A benefit of this intermediary service network selection approach is that existing protocols, e.g., RADIUS and Diameter, may be used without modification. This approach is also not limited to EAP-based authentication methods provided that the home AAA server 24 accepts authentication methods other than EAP AKA and EAP SIM. This scheme may be implemented without introducing additional EAP signaling roundtrips, (unless the network list is too large to be included in the single EAP message), and without modifying the WLAN APs. Efficiencies may dictate APs acting as AAA clients be updated to handle extended NAIs depending on the AAA capabilities of the AP. The problems described above associated with using the SSID or using the Type-Data field in the EAP-Identity Request message are avoided. Backward compatibility is achieved, because WLAN AAA servers that do not support the scheme will attempt to route the AAA messages to the home AAA server. Network information advertised by the WLAN network is not needed, and hence, the intermediary service network selection scheme works even if the WLAN network is not aware of, and thus cannot advertise, all potential intermediary service networks. The intermediary service network selection scheme can coexist with and be combined with other schemes for selection of intermediary visited UMTS network.

Although various example embodiments have been shown and described in detail, the claims are not limited to any particular embodiment or example. None of the above description should be read as implying that any particular element, step, range, or function is essential such that it must be included in the claims scope. Reference to an element in the singular is not intended to mean "one and only one" unless explicitly so stated, but rather "one or more." The scope of patented subject matter is defined only by the claims. The extent of legal protection is defined by the words recited in the allowed claims and their equivalents. All structural and functional equivalents to the elements of the above-described example embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no feature, component or step in the present disclosure is intended to be dedicated to the public regardless of whether the feature, component, or step is explicitly recited in the claims.

The invention claimed is:

1. A method implemented in a mobile terminal comprising:
sending a message to a local access network, and
including in the message a list of intermediary service networks to the local access network so that the local access network can select one of the intermediary service networks to be used in an authentication procedure between the mobile terminal and a home service network of the mobile terminal.

2. The method in claim 1, further comprising:
determining if the local access network is associated with the mobile terminal's home service network, if not, or if the mobile terminal cannot determine whether the local access network is associated with its home service network, sending the list of intermediary service networks to the local access network.

3. The method in claim 1, wherein the intermediary service networks are listed by priority to permit selection of a highest priority intermediary service network, and wherein the list is included in a network access message sent by the mobile terminal.

4. The method in claim 3, wherein the list is created using one or more of the following: a user-defined, visited service networks priority list, a network operator-defined, visited service networks list, a list of forbidden visited service networks, or manual user input.

5. The method in claim 4, wherein the network access message includes an identity comprising a name part and a realm part, and wherein the list is included in the name part or in the realm part.

6. The method in claim 5, wherein the realm part includes a mobile country code and mobile network code associated with each intermediary service network included in the list, and wherein the realm part ends with a home service network realm identifier.

7. The method in claim 4, wherein each intermediary service network is identified in the list using a domain name or a fully-qualified domain name of an authentication server of the intermediary visited service network.

8. The method in claim 3, wherein the network access message is sent as part of a mobile terminal authentication procedure.

9. The method in claim 8, wherein the network access message is an extensible authentication protocol (EAP) identity response message sent in response to an EAP identity request message received by the mobile terminal, and wherein the list is included in a network access identifier (NAI) carried in the EAP identity response message.

10. The method in claim 9, wherein the list is sent using multiple EAP messages.

11. The method in claim 1 used in combination with another scheme for selecting an intermediary cellular communication network based on input from an entity other than the mobile terminal.

12. A method implemented in a local access network for use in providing a roaming mobile terminal access to communications services, comprising:
receiving an access request associated with the mobile terminal requiring authentication with a home service network and a list of intermediary service networks,
selecting from the list received from the mobile terminal an intermediary service network to be used in authenticating the mobile terminal with the home service network.

13. The method in claim 12, wherein the listed intermediary service networks are listed by priority, the method further comprising:
selecting a highest priority intermediary service network in the list for which the local access network has a known route.

14. The method in claim 12, wherein the list is included in a network access message received from the mobile terminal.

15. The method in claim 14, wherein the network access message is received as part of a mobile terminal authentication procedure.

16. The method in claim 15, wherein the network access message is an extensible authentication protocol (EAP) identity response message sent in response to an EAP identity request message received by the mobile terminal, and wherein the list is included in a network access identifier (NAI) carried in the EAP identity response message.

17. The method in claim 16, wherein the list is received in multiple EAP messages.

18. The method in claim 14, wherein the network access message includes an identity comprising a name part and a realm part, and wherein the list is included in the name part or in the realm part.

19. The method in claim 18, wherein the realm part includes a mobile country code and mobile network code associated with each intermediary service network included in the list, and wherein the realm part ends with a home service network realm identifier.

20. The method in claim 14, wherein each intermediary service network is identified in the list using a domain name or a fully-qualified domain name of an authentication server of the intermediary service network.

21. The method in claim 12 used in combination with another scheme for selecting an intermediary cellular communication network based on input from an entity other than the mobile terminal.

22. A mobile terminal comprising:
radio transceiver circuitry for transmitting and receiving information over a radio interface, and
data processing circuitry configured to generate a list of intermediary service networks to be transmitted to the local access network,
wherein the radio transceiver circuitry is configured to transmit the list to the local access network thereby permitting the local access network to select one of the intermediary service networks to be used in an authentication procedure between the mobile terminal and the home service network.

23. The mobile terminal in claim 22, wherein the data processing circuitry is configured to determine if the local access network is associated with the mobile terminal's home service network, if not, or if the mobile terminal cannot determine whether the local access network is associated with its home service network, to send the list of intermediary service networks to the local access network.

24. The mobile terminal in claim 22, wherein the listed intermediary service networks are prioritized to permit selection of the intermediary service networks with a highest priority, and wherein the data processing circuitry is configured to include the list in a network access message to be sent by the transceiver circuitry over the radio interface.

25. The mobile terminal in claim 24, wherein the list is created from one or more of the following: a user-defined, visited service networks priority list, a network operator-defined, visited service networks list, a list of forbidden visited service networks, or manual user input.

26. The mobile terminal in claim 25, wherein the network access message includes an identity comprising a name part and a realm part, and wherein the list is included in the name part or in the realm part.

27. The mobile terminal in claim 26, wherein the realm part includes a mobile country code and mobile network code associated with each intermediary visited service network included in the list, and wherein the realm part ends with a home service network realm identifier.

28. The mobile terminal in claim 25, wherein each intermediary service network is identified in the list with a domain name or a fully-qualified domain name of an authentication server of the intermediary service network.

29. The mobile terminal in claim 24, wherein the network access message is transmitted as part of a mobile terminal authentication procedure.

30. The mobile terminal in claim 29, wherein the network access message is an extensible authentication protocol (EAP) identity response message transmitted in response to an EAP identity request message received by the mobile terminal, and wherein the list is included in a network access identifier (NAI) that is included in the EAP identity response message.

31. The mobile terminal in claim 30, wherein data processing circuitry is configured to transmit the list using multiple EAP messages.

32. A node in a local access network for use in providing a roaming mobile terminal access to communications services, comprising:
means for receiving a request for service associated with the mobile terminal requiring authentication with a home service network of the mobile terminal and a list of intermediary service networks, and
means for selecting from the list received from the mobile terminal an intermediary service network to be used in authenticating the mobile terminal with the home service network.

33. The local access network node in claim 32, wherein the listed intermediary service networks are listed by priority, the means for selecting being configured to select a highest priority intermediary service network in the list for which the node knows a route.

34. The local access network node in claim 32, wherein the list is included in a network access message received from the mobile terminal.

35. The local access network node in claim 34, wherein the network access message is received as part of a mobile terminal authentication procedure.

36. The local access network node in claim 34, wherein the network access message is an extensible authentication protocol (EAP) identity response message sent in response to an EAP identity request message received by the mobile terminal, and wherein the list is included in a network access identifier (NAI) carried in the EAP identity response message.

37. The local access network node in claim 36, wherein the means for receiving is configured to receive the list in multiple EAP messages.

38. The local access network node in claim 34, wherein the network access message includes an identity comprising a name part and a realm part, and wherein the list is included in the name part or in the realm part.

39. The local access network node in claim 38, wherein the realm part includes a mobile country code and mobile network code associated with each intermediary service network included in the list, and wherein the realm part ends with a home service network realm identifier.

40. The local access network node in claim 34, wherein each intermediary service network is identified in the list using a domain name or a fully-qualified domain name of an authentication server of the intermediary visited service network.

41. The local access network node in claim 32, wherein local access network is a wireless local access network (WLAN), the WLAN node is an AAA server, and the home service network and the intermediary service network are public land mobile radio network (PLMNs) that may be a universal mobile telecommunications system (UMTS) network or a general packet radio services (GPRS) network.

* * * * *

UNITED STATES PATENT AND TRADEMARK OFFICE
CERTIFICATE OF CORRECTION

PATENT NO. : 7,551,926 B2  Page 1 of 1
APPLICATION NO. : 10/960780
DATED : June 23, 2009
INVENTOR(S) : Rune It is certified that error appears in the above-identified patent and that said Letters Patent is hereby corrected as shown below:

In Column 2, Line 48, delete "ppext" and insert -- pppext --, therefor.

In Column 2, Line 51, delete "ppext" and insert -- pppext --, therefor.

Signed and Sealed this

Twenty-second Day of December, 2009

David J. Kappos
*Director of the United States Patent and Trademark Office*